Figure 1:
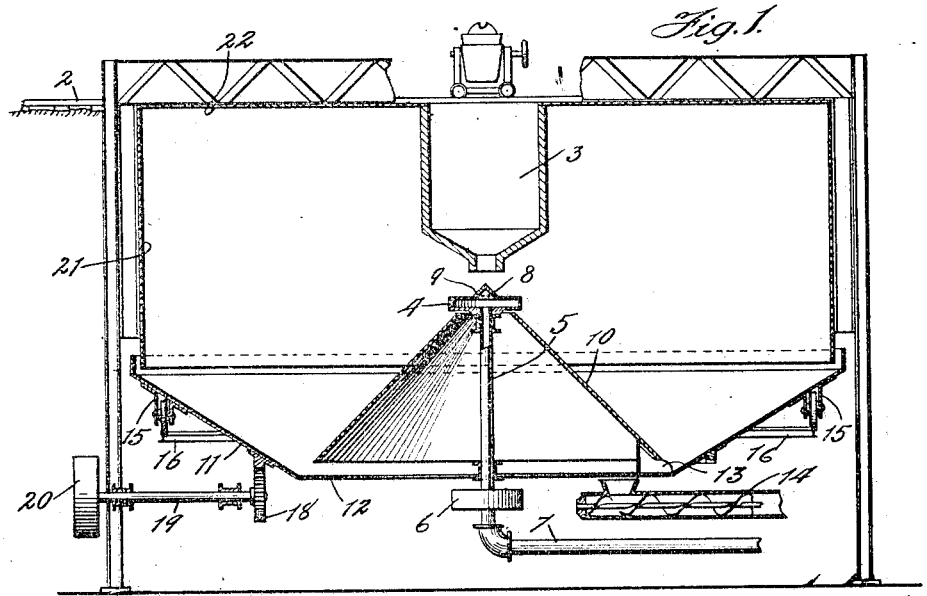

H. L. HARTENSTEIN.
MANUFACTURE OF CARBID.
APPLICATION FILED FEB. 18, 1907. RENEWED AUG. 20, 1909.

946,433.

Patented Jan. 11, 1910.
2 SHEETS—SHEET 1.

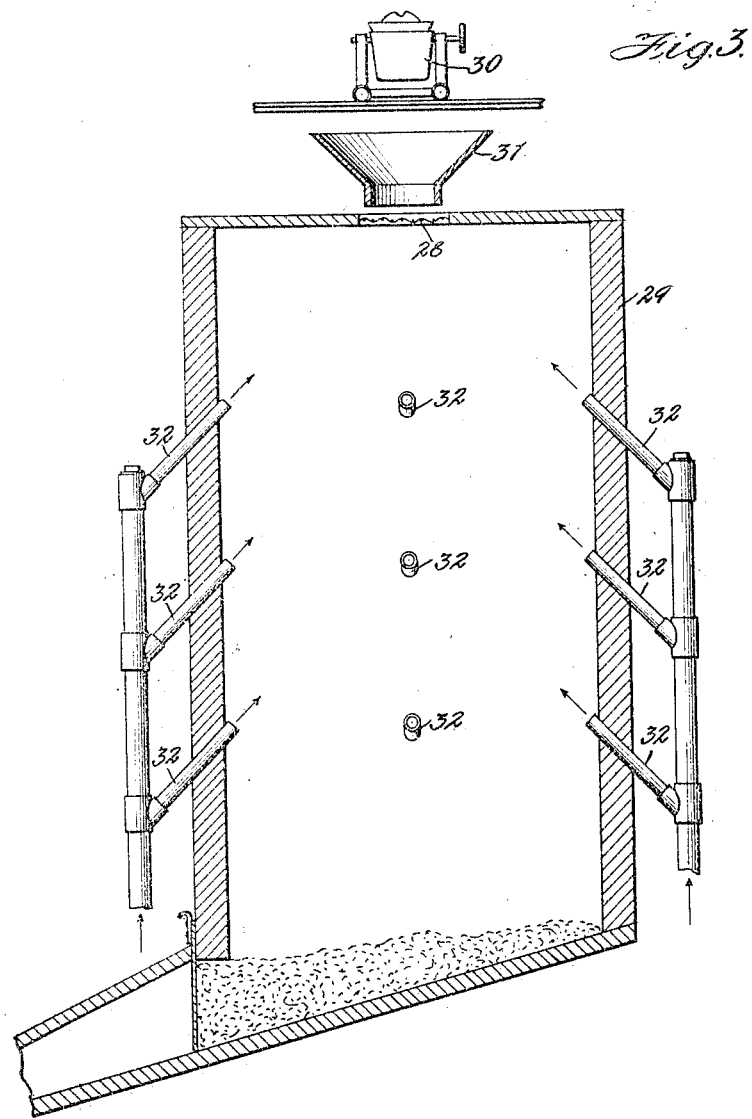

UNITED STATES PATENT OFFICE.

HERMAN L. HARTENSTEIN, OF CONSTANTINE, MICHIGAN, ASSIGNOR, BY MESNE ASSIGNMENTS, TO CONTINENTAL INVESTMENT COMPANY, OF DULUTH, MINNESOTA, A CORPORATION OF MINNESOTA.

MANUFACTURE OF CARBID.

946,433.   Specification of Letters Patent.   Patented Jan. 11, 1910.

Application filed February 18, 1907, Serial No. 358,012. Renewed August 20, 1909. Serial No. 513,888.

*To all whom it may concern:*

Be it known that I, HERMAN L. HARTENSTEIN, a citizen of the United States, residing at Constantine, in the county of St. Joseph and State of Michigan, have invented certain new and useful Improvements in the Manufacture of Carbid, of which the following is a full, clear, and exact specification.

This invention relates to the manufacture of carbid; and it comprises a method of producing carbid in a new and advantageous form by subdividing molten or fluent carbid into drops, portions or relatively small masses in such manner as to preserve the surfaces formed in the subdivision of the liquid or fluent carbid; and it also comprises subdivided carbid in the form of rounded, smooth-surfaced, dense and homogeneous granules or bodies having the surface properties of matter set from the liquid state; all as more fully hereinafter set forth and as claimed.

The main use of calcium carbid is for the production of acetylene and in making this gas it is brought into regulable contact with water. In such contact with water it reacts to produce acetylene and hydrated lime according to the well known reaction, the lime forming a layer on the surface of carbid exposed to the action of the water. Many types of generators are used in the production of acetylene from carbid, but in all the effort is to cause a methodical comparatively slow evolution of gas in amounts proportioned to the temporary requirements for consumption. To accomplish this end, in some types successive portions of water are fed to a main body of carbid while in others (the "carbid feed" type) successive portions of carbid are introduced into a main body of water; the latter type now being the more popular. For either type it is necessary that the material be in the form of relatively small granules. With a large mass or lump of carbid, the layer of lime forming on the reacting face soon becomes so thick as to render the penetration of water slow and irregular, with concomitant irregularities in the production of gas and particularly where temporary stoppages of operation give the lime time to crystallize, set and harden. The granules must, however, be substantially free of dust or fine powder. Dust-like carbid or granulated carbid containing much dust is not commercially valuable since it rapidly deteriorates (the surface exposed to aerial action being of course inordinately large) and since it is difficult to handle in the generators. On contacting carbid dust with water the evolved gas buoys it up and causes it to float, the dust-like particles not being sufficiently heavy to counter-balance the adhering gas bubbles, thus disturbing the normal operation of the generator.

In the ordinary methods of manufacturing calcium carbid, molten carbid is allowed to solidify in relatively large blocks, ingots or bodies, either in the furnace in which it is produced or in special ingot molds. The cooling of these large bodies is of course relatively slow, the exterior solidifying before the interior, and during the cooling segregation and crystallization take place in the interior with development of relatively large crystals and distinct cleavage planes, while blowholes, pipes and cavities are also formed, the interior being frequently rather spongy, especially toward the center. The interior portions are also softer and less dense in texture than the exterior; and for some reason, but possibly because of segregation phenomena, are usually richer in gas producing carbids. In producing the commercial carbid, these blocks or ingots are broken or crushed and the fragments sized to produce the different commercial sizes of granules. In crushing the hard, flint-like material an inordinate amount of dust is produced, this dust coming largely from the soft and rich interior portions. As stated, this dust is, however, practically useless, being a waste product, and its production not only adds to the expense of manufacture but is detrimental to the health of the workmen. Nor, without the use of special methods, can it be remelted and converted once more into block carbid. The granules of carbid made in this manner being fractured fragments of a large, and frequently highly crystalline, mass containing relatively large crystals, are angular, rough-surfaced and sharp-edged, the fractures tending to follow crystal planes and line of cleavage, and they expose a large surface in comparison to their volume so that the wastage by atmospheric deterioration in storage and handling is large. Furthermore, having been produced by crushing, the granules are cracked, fissured and shattered so that they tend to break down mechanically in handling, while the fissures and cleavage planes offer avenues for the penetration of moisture, both from the air and in the generator, which interiorly oxidizes and expands the carbid, causing the granule to crumble down. In the generator, the angular fragments pack more or less and in the carbid feed type of generator, they are difficult to feed mechanically without elaborate and powerful mechanism. For this reason the use of relatively small carbid feed generators has not proved very practicable. The sharp-edged fragments are also inconvenient in storage and shipment since they tend to cut or wear through package walls thereby not only exposing the contents of a drum or package to atmospheric deterioration but generating gas and endangering life and property.

In the present invention, I have devised a way of obviating the difficulties and waste of the described process of producing granular carbid and have also devised a new form of carbid better adapted for packaging, handling and use. In lieu of comminuting the carbid after it has set to a flint-like hardness, as is usually done, I perform the comminution while the carbid is still molten, soft or plastic.

By subdividing molten carbid into molten drops or portions, the subdivision may be accomplished with a minimum of labor, time and machinery while there can be no material production of fines where the operation is properly conducted. Where the subdivision is accomplished by forming drops and allowing these a period of free fall through air or gas sufficient to insure solidification prior to collection, the carbid assumes globular or rounded forms very advantageous for the present purposes. Ball-like granules of carbid are readily collected, sized, packaged, stored and handled; and the various operations may be carried through without allowing any substantial contact of the material with moist air. In the ordinary methods of comminuting pre-formed solid carbid by crushing and grinding, contact with ordinary air is of course practically unavoidable.

In a carbid ball or sphere, the surface exposed for atmospheric attack as compared with the volume is of course at an absolute minimum; and such surface, moreover, in carbid produced according to the present invention presents peculiarities which render it comparatively resistant against such attack. The free surface of any liquid is in a state of what is known as "surface tension"; and for many purposes behaves as if covered with a dense, tough skin. In solidifying small bodies of carbid with free surfaces, this peculiar dense texture remains in the finished product, and such surfaces of course also remain smooth. Furthermore, where the carbid is solidified in small portions, solidification is too rapid to permit any substantial crystallization with production of well developed crystals or segregation and the granules are therefore dense and homogeneous. While the mass in such a solidified portion may perhaps be regarded as crystalline or cryptocrystalline in character, it is not crystalline in the sense of having any well-developed or definite crystals, being more stonelike in character. And, not being exposed to any crushing action, the granules are not fissured or cracked. In the absence of fissures, cracks or cleavage planes no avenues are offered by which air or moisture can enter, either in storage or in the generator, to produce swelling oxidation products and crumble down the granule into dust.

The subdivision of the molten carbid may be accomplished by any convenient means; and the product obtained may be balls, globules, grains, nodules, pellets, threads, shreds or filaments; this depending upon the means employed. The formation of drops and the solidification of these drops by giving them a period of free fall through air or gas is however very advantageous and gives a product having many important advantages. The sphericity of the product will depend upon the period of fall prior to solidification, but in any event the product will be rounded and devoid of angular edges. It is better to obtain a granule as nearly globular as may be.

With these dense, hard, homogeneous, smooth-surfaced, rounded or ball-like granules of carbid the operation of the acetylene generator is rendered much more convenient, regular and certain. Access of a certain amount of moisture to the carbid in the carbid-storage reservoir of the generator practically cannot be avoided, but with the hard-surfaced, uncracked and unfissured homogeneous granule devoid of crystal planes, this moisture cannot enter into the interior of any granule and crumble it down into dust to impede the operation. And the ball-like granules with their smooth, hard surfaces roll and feed readily, feeding as readily as so much shot. With the ordinary sharp-edged, ragged, irregular fragments of crushed carbid, a carbid-feed generator requires special and particular types of mechanism for feeding and these fragments are very apt to pack and bridge across delivery openings; a difficulty accentuated by the inevitable presence of lime dust from crumbled lumps. With the new type of carbid granule, simple feed mechanisms may be employed in lieu of the relatively complicated apparatus now in use and it is practicable to employ as small an apparatus as may be desired. In water-feed generators the new type of carbid is also advantageous as giving a more regular evolution of gas because of the more regular shape.

The molten carbid employed in producing the new form may be made in any of the usual ways and from any of the usual materials; its particular composition or source not being important in the present invention. It is tapped from the furnace or other place of production in the usual manner and is thereafter subdivided while still molten or plastic, it being advantageously still freely fluid during such subdivision. The subdivided portions are allowed to solidify while out of contact, or substantially out of contact, with one another and solidification or chilling is permitted to go so far that the portions or particles will not be adhesive on their surfaces and cohere on again contacting in assembling. A less far-going chilling leaving the particles still somewhat adhesive so that they will unite integrally on meeting surfaces and produce a honeycombed or cellular structure consisting of hard dense grains autogenously united together but having open spaces between them is desirable for some purposes, but this specific embodiment of the present invention is not herein specifically claimed, it forming the subject matter of another and copending application, Ser. No. 358,013, filed Feb. 18, 1907.

An advantageous method of operation is to perform the subdivision in a manner analogous to that adopted in making drop shot, the molten carbid being allowed to fall down a shaft under such thermal conditions that it preserves its fluidity sufficiently long to form spherical or rounded drops prior to solidification. No cushioning body of water can be employed of course and though other and inert liquids may be substituted, still they are not necessary and are often disadvantageous. The carbid is sufficiently high melting to become hard and solid on reaching the bottom of a moderately low shaft or tower. However, upwardly directed drafts of air or gas may be employed to cushion and prolong the fall of the drops if desired, such drafts also operating to produce a methodical and desirable type of cooling within the tower. The atmosphere within the tower or the aeriform fluid used for the upward blasts is not a matter of indifference, but even with ordinary air a short period of operation is sufficient to free it of harmful moisture and gases. It is advantageous however to use a gas poor in oxygen and it may be high in carbon if desired.

Another method consists in subjecting falling or streaming molten carbid to a blast of air or gas directed therethrough. This results in dispersing or scattering the molten mass in the form of drops or filaments; the form and size depending upon the thermal conditions of gas and carbid, upon the velocity of the blast and the amount of carbid, etc. It is better to regulate the conditions to obtain rounded or spherical balls, pellets or nodules, filaments and shreds not being as desirable as the rounded shapes which will roll easily in the generator. The operation should be performed in a closed chamber and should be so conducted, in the present specific embodiment of this invention, that the particles, drops, portions or bodies are not only solid when collected but are substantially devoid of surface adhesiveness or stickiness.

Still another advantageous method comprises depositing the molten carbid on a revolving table whence it will be thrown radially outward under centrifugal force as drops or globules. By regulating the speed of the table and the feed of the molten carbid, the size of these dispersed bodies will also be regulated. The higher the speed, with molten carbid of given temperature, the smaller the pellets formed. The operation may be facilitated by the action of cooling and cushioning blasts of air or gas fed radially outward in the path of the flying carbid, as by passing outward from orifices or the like in the center of the revolving table. The top of the revolving table may be stepped into annular steps, or otherwise sloped, like a cone pulley, allowing the discharged portions of carbid to pass downward as well as outward. The revolving table is best mounted in a closed, air-tight casing which may be provided with a hopper at its base for receiving the solidified carbid granules. An intermediate revolving body may be employed to keep the granules in motion and prevent their sticking together in the final stages of solidification.

The granules however produced are sized and packaged in the usual manner.

In the accompanying illustration I have shown, more or less diagrammatically, certain types of apparatus of the many adapted for use in performing the described process.

Figure 2:
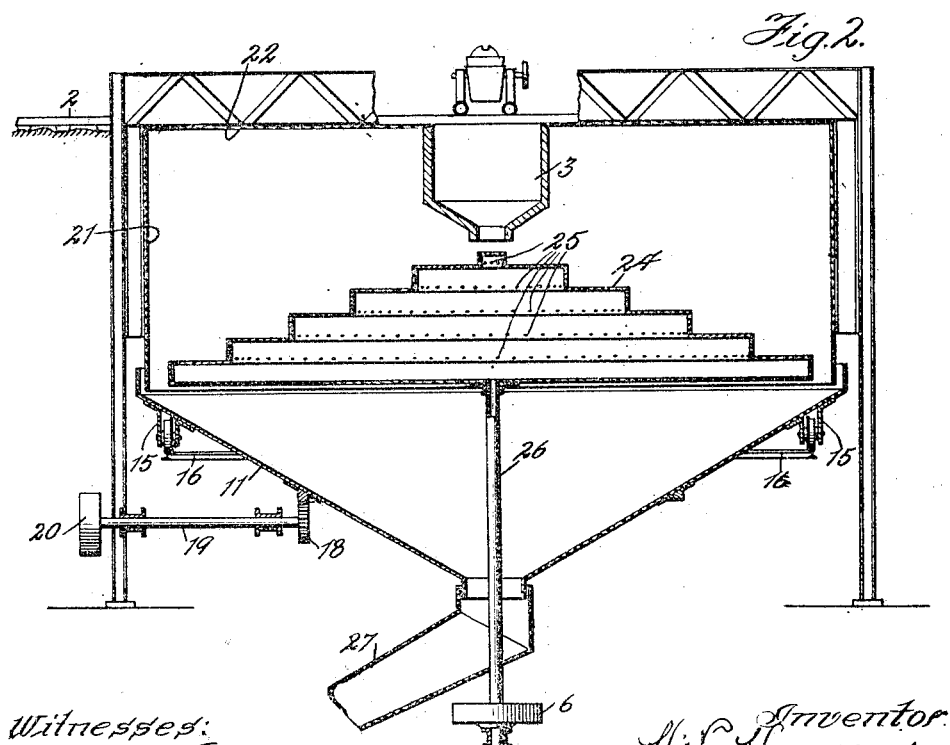

In this showing:—Figure 1 is a central vertical section of one form of apparatus, shown partly broken away; Fig. 2 is a similar view of a modified form; and Fig. 3 is a similar section of a different type of apparatus.

Referring first to the showing of Fig. 1, 1 is a car of a suitable form and material to adapt it to transport molten carbid from the place of production, the car being shown as a tilting ladle car of ordinary shape traveling on track 2 and dumping carbid into funnel or hopper 3. Below this hopper is mounted revolving table 4, mounted on hollow shaft 5 deriving motion through pulley 6 or other suitable means. Pipe 7 allows introduction of air or gas from a suitable source (not shown) into the hollow shaft under pressure. At its upper end the hollow shaft is closed by a coned cap 8, provided with side openings or perforations 9 so located and arranged as to permit air or gas jets to pass outward radially across the table, assisting the centrifugal action in the dispersion of the molten carbid as subdivided portions. Below the revolving table is mounted a fixed cone 10 surrounded by a rotatable hopper-shaped bottom plate or element 11, this element extending somewhat beneath the cone and being provided with annular flange 12. Scraper element 13 serves to direct the solidified granules to conveyer 14, carrying them to suitable sizing and grading machinery (not shown). Rotation of the hopper-shaped bottom plate is accomplished by mounting it upon rollers 15, supported upon a circular track 16, and providing it with annular gear ring 17, actuated by gear 18 on a shaft 19 which is provided with pulley 20. Annular side wall 21 fitting down into the hopper bottom and top 22 serve to exclude the air and to prevent loss of flying carbid.

In the structure shown in Fig. 2, the table 24 is provided with a series of steps, orifices or ports 25 being provided to discharge air or gas opposite the horizontal part of each step. The rotating element is of course hollow and is supplied with air or gas through shaft 26. In this modification, the cone of the previous figure is omitted and the hopper bottom is extended centrally around the shaft, fitting at its base into discharge conduit 27. Other elements are the same as in Fig. 1.

In Fig. 3 is shown an apparatus permitting the formation of carbid pellets by direct free fall, molten carbid being allowed to pass through sizing sieve 28 mounted at the top of tower 29, the carbid coming from ladle car 30 through hopper 31. At various points along the length of the tower are mounted upwardly directed blast pipes 32, introducing cushioning and temperature regulating jets of air or gas.

In the operation of the structure of Fig. 1, the molten carbid falling on the top of the rotary table is thrown outwardly as drops or small bodies by centrifugal action or by centrifugal action aided by the radial gas or air jets, and falls as solid balls or pellets upon the coned elements 10 and 11, down which it rolls to the bottom, whence it is removed by the conveyer. With a slow rotation of the table, the force of the gas jets may be depended on to disrupt and disperse the molten carbid flowing over its edge. The operation of Fig. 2 is the same save that the carbid pellets fall successively over the edges of the stepped elements of the table. In Fig. 3, the molten carbid passing through the sieve is converted into drops and these solidify in their progress downward, such progress being retarded to any degree desirable by the upwardly passing jets of air or gas from twyers 32, such jets also serving to control the temperature differential between the top and bottom of the tower so as to insure solidification in rounded bodies or shot form.

In the illustration, for the sake of simplicity of showing, the various elements are represented only diagrammatically, refractory linings, heating means and the like being omitted as unnecessary in explaining the principles involved in this invention.

What I claim is:—

1. As a new article of manufacture, calcium carbid in the form of detached individual solidified substantially non-angular and rounded particles.

2. As a new article of manufacture, calcium carbid in the form of detached separate solidified particles.

3. As a new article of manufacture, calcium carbid in the form of detached pellets.

4. As a new article of manufacture, calcium carbid in the form of separately cooled drops.

5. As a new article of manufacture, calcium carbid in the form of detached solidified globules.

6. As a new article of manufacture, calcium carbid in the form of small detached, solidified particles, having smooth, non-crystalline and non-angular surfaces.

7. As a new article of manufacture, a mass of carbid composed of small individual particles, each such particle possessing the properties of a drop set from the molten state.

8. As a new article of manufacture, a mass of calcium carbid composed of small individual particles, each such particle possessing the properties of a drop set from the molten state.

9. In the manufacture of carbid, the process which comprises disintegrating such carbid into a multiplicity of relatively small particles while such carbid is hot and plastic.

10. In the manufacture of calcium carbid, the process which comprises disintegrating calcium carbid into a multiplicity of relatively small particles while such carbid is hot and plastic.

11. As a new article of manufacture, calcium carbid in the form of a plurality of small detached particles, each such particle having rounded surfaces and being substantially free of well developed cystallization and of exterior or interior lines of cleavage.

12. The method of converting molten calcium carbid into particles which comprises subdividing the mass of carbid while in the molten state, and allowing the sub-divisions to cool out of contact with solids.

13. The method of converting a carbid into particles, which comprises scattering the carbid mass while in a molten state, and allowing the scattered particles to solidify while separated.

14. The method of subdividing a carbid into small particles, which comprises subjecting the molten mass of carbid to a blast of fluid under pressure, and allowing the scattered particles produced to solidify.

15. The method of subdividing carbid into small particles, which comprises forming molten carbid into drops and allowing the drops to solidify out of contact with each other.

16. The method of converting calcium carbid into particles which comprises subdividing the mass of carbid while in the molten state into small particles and allowing the particles to cool in the presence of a gas out of contact with solids.

17. The method of converting a carbid into particles which comprises subdividing the mass of carbid while in the molten state into small drops and allowing the drops to cool while in suspension and out of contact with solids and each other.

18. The method of converting calcium carbid into small particles which comprises subdividing a mass of carbid while in the molten state into drops or globules and allowing the drops or globules to solidify out of contact with solids or liquids.

19. The method of sub-dividing calcium carbid into small particles which comprises forming molten carbid into small drops or globules and allowing said drops or globules to cool out of contact with one another.

20. As a new article of manufacture, calcium carbid in the form of a mass of small, rounded, dense, homogeneous, smooth-surfaced particles, the surfaces of such particles having the properties of surfaces set from a molten state.

21. As a new article of manufacture, calcium carbid in the form of a mass of small, substantially spherical, dense, homogeneous smooth-surfaced particles, the surfaces of such particles having the properties of surfaces set from a molten state.

22. As a new article of manufacture, calcium carbid in the form of a round, homogeneous, dense, substantially non-crystalline, smooth-surfaced body, the surfaces of such body having the properties of surfaces set from a molten state.

In testimony whereof I have signed my name to this specification, in the presence of two subscribing witnesses, on this 16th day of February A. D. 1907.

HERMAN L. HARTENSTEIN.

Witnesses:
FRANCIS A. HOPKINS,
FRANK T. BROWN.